United States Patent
Kung et al.

(10) Patent No.: US 8,890,485 B2
(45) Date of Patent: Nov. 18, 2014

(54) CHARGER CIRCUIT

(75) Inventors: Nien-Hui Kung, HsinChu (TW); Kwan-Jen Chu, Hsinchu (TW)

(73) Assignee: Richtek Technology Corporation, R.O.C., Hsin-Chu (TW)

( * ) Notice: Subject to any disclaimer, the term of this patent is extended or adjusted under 35 U.S.C. 154(b) by 763 days.

(21) Appl. No.: 12/574,035

(22) Filed: Oct. 6, 2009

(65) Prior Publication Data

US 2011/0080142 A1 Apr. 7, 2011

(51) Int. Cl.
*H02J 7/04* (2006.01)
*H02J 7/00* (2006.01)

(52) U.S. Cl.
CPC .................................. *H02J 7/0072* (2013.01)
USPC .......................................... 320/155; 320/164

(58) Field of Classification Search
USPC ........................... 320/134, 141, 155, 159, 164
See application file for complete search history.

(56) References Cited

U.S. PATENT DOCUMENTS

| | | | | |
|---|---|---|---|---|
| 5,157,320 | A | * | 10/1992 | Kuriloff ........................ 320/151 |
| 5,168,206 | A | * | 12/1992 | Jones ............................ 320/163 |
| 5,670,863 | A | * | 9/1997 | Broell et al. .................. 320/145 |
| 2002/0101218 | A1 | * | 8/2002 | Koenck et al. ................ 320/140 |

* cited by examiner

*Primary Examiner* — Edward Tso
*Assistant Examiner* — Aaron Piggush
(74) *Attorney, Agent, or Firm* — Tung & Associates

(57) ABSTRACT

A charger circuit comprising: a charging path coupled between an input voltage and a battery; a power switch on the charging path; a switch control circuit controlling the power switch; a timer counting a charging period; and a low current control circuit issuing a signal to the switch control circuit to control the power switch such that a charging current is maintained to be a predetermined low current when the timer counts to a predetermined maximum charging period.

3 Claims, 3 Drawing Sheets

CHARGER CIRCUIT

BACKGROUND OF THE INVENTION

1. Field of Invention

The present invention relates to a charger circuit, and particularly to a charger circuit capable of shifting to a low charging current after a predetermined maximum charging period is reached.

2. Description of Related Art

When a battery is being charged, whether to stop charging or not is usually determined by detecting if the battery voltage reaches a predetermined voltage. Yet, if the battery is dead, the battery voltage will never reach the predetermined voltage and the charger will be charging forever. Therefore, the prior art further provides a timer, such that the charging current is stopped when a predetermined maximum charging period is reached. The battery may be charged by a constant current or a variable current. U.S. Pat. No. 6,922,039 discloses a method for counting a charging time of a variable charging current, wherein the charging current is stopped when a predetermined maximum charging period is reached.

However, if the battery is a poor battery but not dead, that is, it is charged by a low rate for certain reasons but is not completely damaged, the poor battery which is still usable will be determined dead and is no more charged by the foregoing prior art.

SUMMARY OF THE INVENTION

In view of the foregoing drawback, the present invention provides a charger circuit, which maintains a predetermined low charging current after a predetermined maximum charging period is reached, lest a usable battery is determined dead. The low current for example can be a current below a lower limit of a normal charging current.

According to the foregoing objective, in one perspective of the present invention, it provides a charger circuit comprising: a charging path coupled between an input voltage and a battery; a power switch on the charging path; a switch control circuit controlling the power switch; a timer counting a charging period; and a low current control circuit issuing a signal to the switch control circuit to control the power switch such that a charging current to the battery becomes a predetermined low current after the timer counts to a predetermined maximum charging period.

The foregoing charger circuit preferably further comprises an oscillator whose frequency is changed according to the charging current, and wherein the timer counts the charging period according to the frequency of the oscillator.

In the foregoing charger circuit, the power switch can be a power switch in one of the following power converter circuits: synchronous buck power converter, synchronous boost power converter, synchronous buck-boost power converter, synchronous inverter power converter, fly-back power converter, asynchronous buck power converter, asynchronous boost power converter, asynchronous buck-boost power converter, and asynchronous inverter power converter.

In the foregoing charger circuit, the switch control circuit can turn off the power switch after the battery is charged by the predetermined low current for a predetermined period.

The objectives, technical details, features, and effects of the present invention will be better understood with regard to the detailed description of the embodiments below, with reference to the drawings.

DESCRIPTION OF THE PREFERRED EMBODIMENTS

Figure 1:
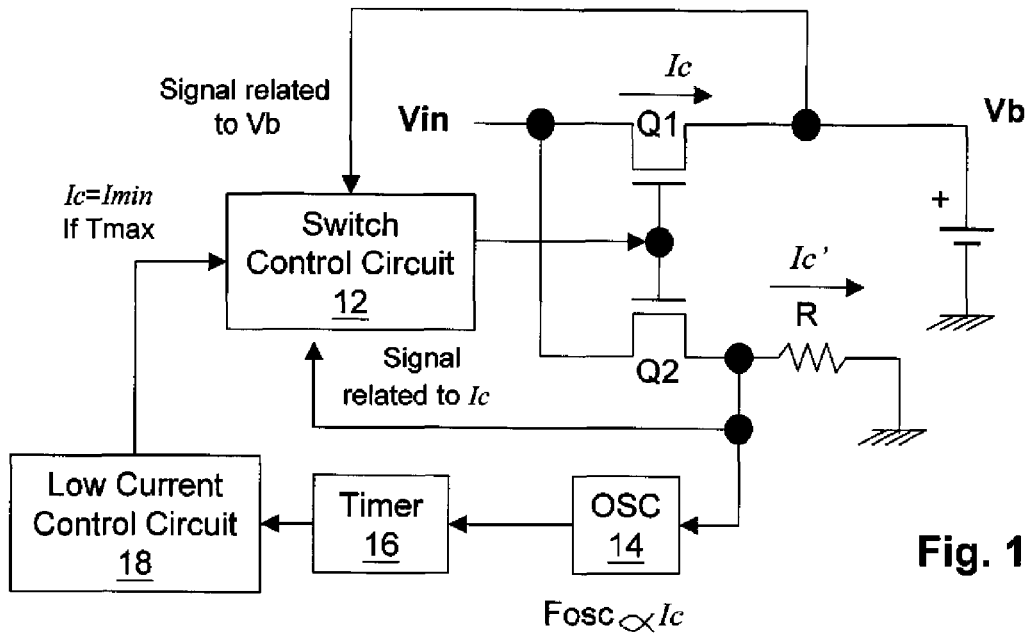
FIG. 1 is a schematic circuit diagram showing a first embodiment of the present invention.

Please refer to FIG. 1, which illustrates a first embodiment of a charger circuit according to the present invention. As shown in the drawing, an input voltage Vin charges a battery via a power transistor switch Q1 on a charging path, wherein the battery voltage is Vb. The power switch Q1 is controlled by a switch control circuit 12. In this embodiment, the charging current can be a non-constant value; the switch control circuit 12 determines not only the on/off state of the power switch Q1 but also how much it is turned on. The charger circuit detects the battery voltage Vb and the charging current Ic, and such information are fed back to the switch control circuit 12, so that the switch control circuit 12 controls the power switch Q1 thereby.

There are many ways to detect the charging current Ic. In this embodiment, a transistor Q2 is employed to copy the charging current Ic so as to generate a current Ic' flowing through a resistor R; hence, a voltage Ic'×R is generated at the left side of the resistor R, wherein this voltage is proportional to the charging current Ic. Notably, the transistor Q2 is not required to completely match the power switch Q1. The current Ic' is not required to be equal to Ic, but is only required to be a function of Ic. If the battery is charged by the charger circuit with a constant current, the circuit for detecting the charging current Ic can be omitted.

The information related to the charging current Ic can be further provided to an oscillator (OSC) 14, such that the frequency of the oscillator 14 is changed according to the charging current Ic, and a timer 16 counts the charging period according to the frequency of the oscillator 14. Thus, the charging period can be traced dynamically. However, if the battery is charged by the charger circuit with a constant current, the oscillator 14 can be omitted, similarly as the above.

When the timer 16 counts to a predetermined maximum charging period, it issues a signal to a low current control circuit 18, and the low current control circuit 18 issues a signal to the switch control circuit 12 correspondingly. After the predetermined maximum charging period is reached, the switch control circuit 12 will not control the power switch Q1 according to the feedback information related to the battery voltage Vb and the charging current Ic. Instead, it controls the power switch Q1 to keep charging the battery with a predetermined low current Imin. In one embodiment, the low current Imin is a constant, such as a current below a lower limit of a normal charging current. In another embodiment, the low current Imin is a non-constant.

Note that FIG. 1 is drawn for illustrating the concept of the present invention. The low current control circuit 18 does not have to be a stand-alone circuit; it can be part of the switch control circuit 12.

The maximum charging period can be determined during circuit design, or set externally from outside of the circuit during circuit application. In addition, after the battery is charged by the low current Imin for a period of time, the power switch Q1 can be turned off.

Figure 2:
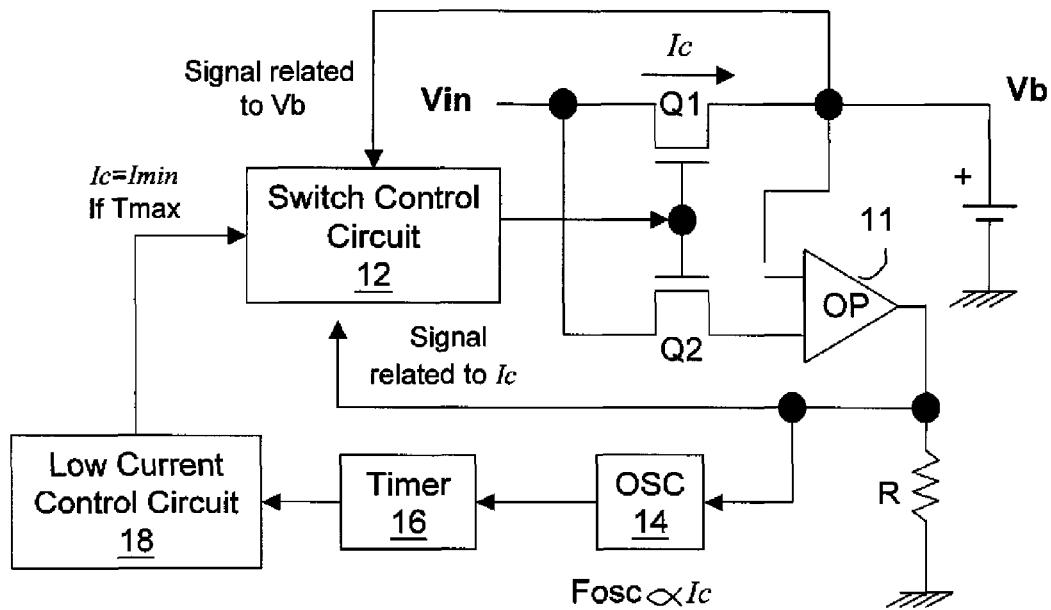
FIG. 2 is a schematic circuit diagram showing a second embodiment of the present invention.

FIG. 2 shows another embodiment of the present invention. In this embodiment, an operational amplifier (OP) 11 is provided, to match the current through the transistor Q2 to the current through the power switch Q1 more precisely. The other parts of this circuit are the same as those in the first embodiment, and the details are thus omitted here.

Figure 3:
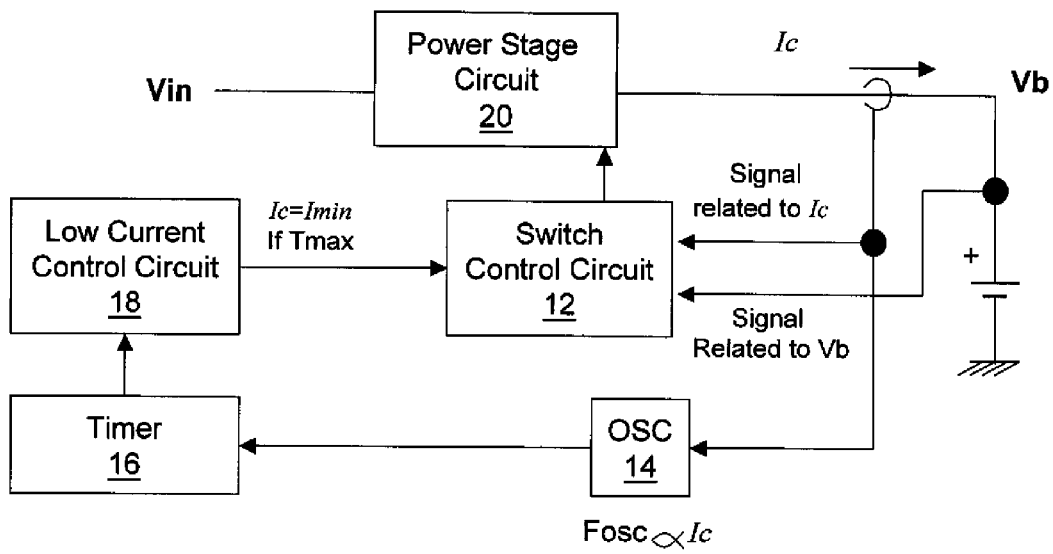
FIG. 3 is a schematic circuit diagram showing a third embodiment of the present invention.

In the foregoing embodiments, the battery is charged by the voltage Vin via the power switch Q1. However, the spirit of the present invention is not limited therein; the input voltage Vin can charge the battery via many types of power converters. Referring to FIG. 3, the battery is charged by the voltage Vin via a power stage circuit 20. This power stage circuit 20 can be, for example but not limited to, one of the following circuits: synchronous buck power converter, synchronous boost power converter, synchronous buck-boost power converter, synchronous inverter power converter, fly-back power converter, asynchronous buck power converter, asynchronous boost power converter, asynchronous buck-boost power converter, and asynchronous inverter power converter, for example as shown in FIGS. 5A-5G. Referring back to FIG. 3, the charger circuit detects the battery voltage Vb and the charging current Ic, and such information are fed back to the switch control circuit 12. The switch control circuit 12 controls the power switch in the power stage circuit 20 according to such information.

Similarly to the abovementioned embodiments, the information related to the charging current Ic can also be provided to the oscillator 14, and the timer 16 counts the charging period according to the frequency of the oscillator 14. When the timer 16 counts to the predetermined maximum charging period, the low current control circuit 18 issues a signal to the switch control circuit 12. Accordingly, the switch control circuit 12 controls the power switch in the power stage circuit 20 to keep charging the battery by the low current Imin.

Figure 4:
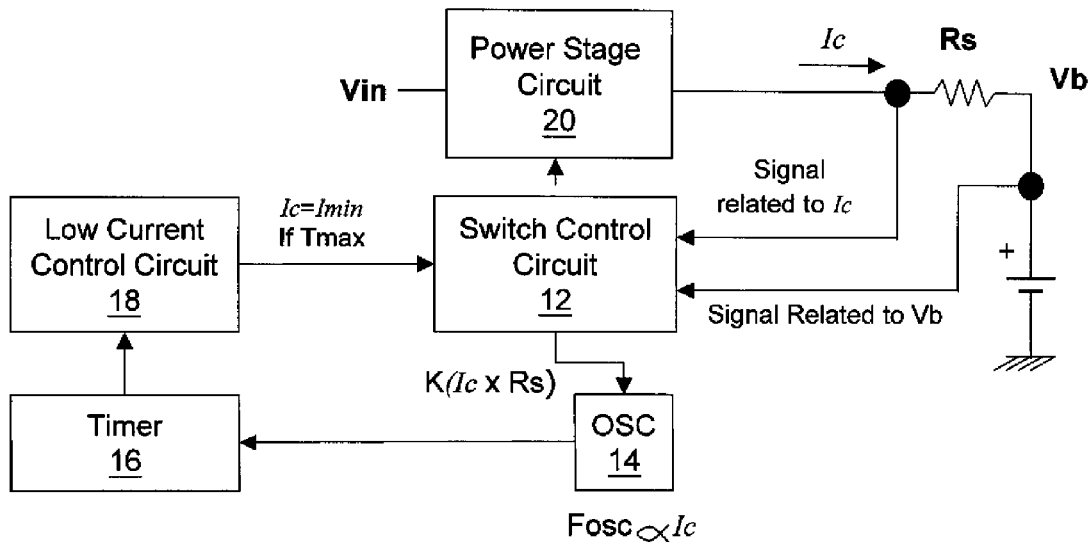
FIG. 4 is a schematic circuit diagram showing a fourth embodiment of the present invention.
Figure 5A:
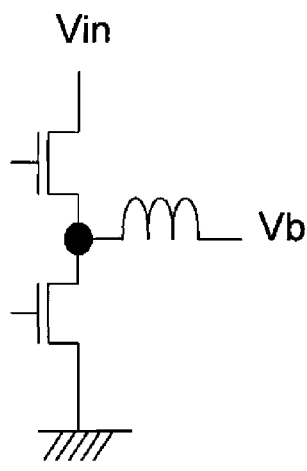
FIGS. 5A-5G show several embodiments of the power stage circuit 20.
Figure 5B:
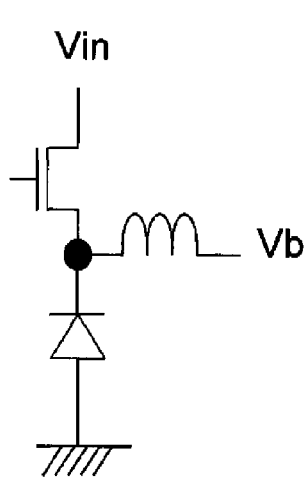
Figure 5C:
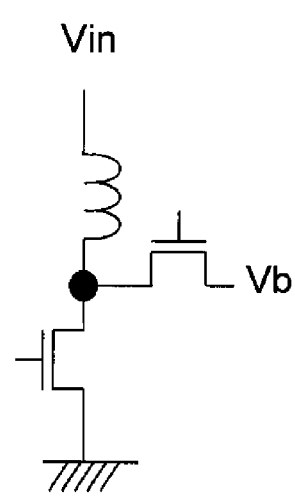
Figure 5D:
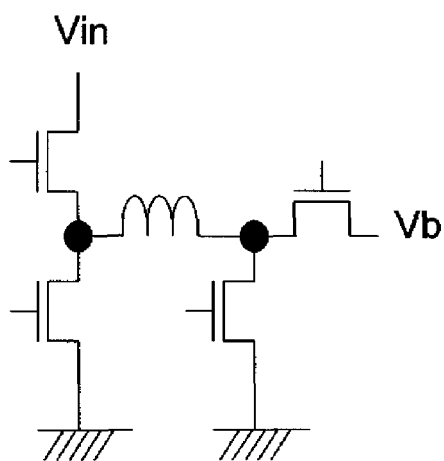
Figure 5E:
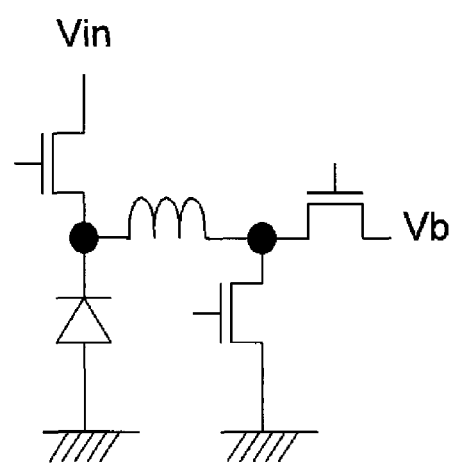
Figure 5F:
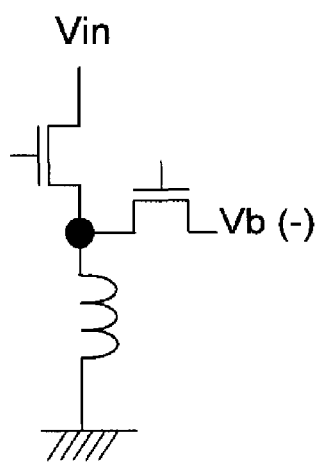
Figure 5G:
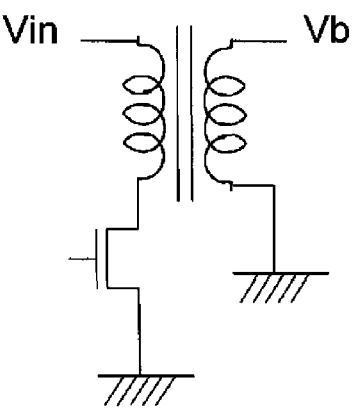

FIG. 4 shows an example for detecting the charging current Ic, in which a resistor Rs is connected in series on the path of the charging current Ic. Hence, information of the charging current Ic can be indicated by voltage Ic×Rs; namely, the information related to the charging current Ic can be obtained by dividing a voltage difference across the resistor Rs by the resistance of the resistor Rs.

The oscillator 14 can be voltage-controlled or current-controlled. In the embodiment in FIG. 4, as one example, the oscillator 14 is controlled by voltage and is changed in accordance with information related to the charging current Ic, that is, K(Ic×Rs). The information K(Ic×Rs) can be obtained by comparing the voltages at two ends of the resistor Rs, by an operational amplifier. This information can be acquired independently from the charging path. Yet, since the information related to the charging current Ic has been obtained by the switch control circuit 12, the oscillator 14 can directly retrieve such information from the switch control circuit 12 to save cost.

In the embodiments of FIG. 3 and FIG. 4, similarly, if the charger circuit charges the battery by a constant current, the oscillator 14 can be omitted. The low current control circuit 18 does not have to be a stand-alone circuit; it can be part of the switch control circuit 12. The low current Imin can be a constant current or non-constant current. After the low current Imin has charged the battery for a period of time, the power switch Q1 can be turned off.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. A method to charge a battery by a charger circuit, comprising:
   charging the battery by a first charging current and counting a predetermined maximum charging period; and
   after the predetermined maximum charging period and the battery has not yet reached a predetermined voltage in the predetermined maximum charging period, charging the battery by a second charging current, the second charging current being a predetermined non-zero constant low current which is lower than the first charging current to determine whether the battery is usable, that it is chargeable by a low rate and is not completely unchargeable.

2. The method of claim 1, wherein the first charging current has a lower limit, and the predetermined non-zero constant low current is a current below the lower limit.

3. The method of claim 1, wherein when the battery is usable, the battery is charged by the predetermined non-zero low current and a voltage of the battery increases.

* * * * *